United States Patent
Ezumi et al.

(10) Patent No.: US 6,557,746 B2
(45) Date of Patent: May 6, 2003

(54) FRICTION STIR BONDING METHOD

(75) Inventors: Masakuni Ezumi, Kudamatsu (JP); Kazushige Fukuyori, Kudamatsu (JP); Tetsuya Matsunaga, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,668

(22) Filed: Feb. 26, 2001

(65) Prior Publication Data

US 2002/0030081 A1 Mar. 14, 2002

(30) Foreign Application Priority Data

Sep. 13, 2000 (JP) .................................... 2000-277551

(51) Int. Cl.$^7$ .............................................. B23K 20/12
(52) U.S. Cl. ................................... 228/112.1; 228/2.1
(58) Field of Search ............................. 228/112.1, 2.1

(56) References Cited

U.S. PATENT DOCUMENTS

| | | | |
|---|---|---|---|
| 5,460,317 A | * | 10/1995 | Thomas et al. |
| 5,697,544 A | * | 12/1997 | Wykes |
| 5,718,366 A | * | 2/1998 | Colligan |
| 6,045,027 A | * | 4/2000 | Rosen et al. |
| 6,053,391 A | * | 4/2000 | Heideman et al. |
| 6,193,137 B1 | * | 2/2001 | Ezumi et al. |
| 6,206,268 B1 | * | 3/2001 | Mahoney |
| 6,227,430 B1 | * | 5/2001 | Rosen et al. |
| 6,237,835 B1 | * | 5/2001 | Litwinski et al. |

FOREIGN PATENT DOCUMENTS

| | | | |
|---|---|---|---|
| EP | 797043 | | 9/1997 |
| EP | 0 797 043 A2 | | 9/1997 |
| EP | 0 867 254 A1 | | 9/1998 |
| EP | 0893190 A2 | * | 1/1999 |
| EP | 1103334 A1 | * | 5/2001 |
| EP | 1103334 | | 5/2001 |
| EP | 1129810 | | 9/2001 |
| GB | 2306366 A | * | 5/1997 |
| GB | WO 99/52669 | * | 10/1999 |
| JP | 10201189 | | 7/1998 |
| JP | 10249552 | | 9/1998 |
| JP | 11-28583 | | 2/1999 |
| JP | 11028581 | | 2/1999 |
| JP | 11179568 A | * | 7/1999 |
| JP | 11226755 A | * | 8/1999 |
| JP | 11-267859 | | 10/1999 |
| JP | 11300481 | | 11/1999 |
| NO | WO 95/26254 | * | 10/1995 |

OTHER PUBLICATIONS

US 2001/0007717A1 Ezumi et al. (Jul. 12. 2001).*

* cited by examiner

Primary Examiner—Tom Dunn
Assistant Examiner—Kiley Stoner
(74) Attorney, Agent, or Firm—Antonelli, Terry, Stout & Kraus, LLP

(57) ABSTRACT

End portions of members 10, 20 are abutted against each other. A trapezoidal convex portion 22 of the member 20 is inserted into a trapezoidal concave portion 12 of the member 10. A friction stir welding is performed by inserting a rotary tool 50 from the side of raised portions 13, 23. A small-diameter portion 51*b* of the rotary tool 50 is tapered and is provided with a screw thread 51*b*. A large-diameter portion 53 is of a member different from an axis portion of the rotary tool 50 and is connected thereto by a pin 59. The screw thread of the screw thread portion 51*b* could be formed in the vicinity of a concave surface 53*g* of an end surface of the large-diameter portion 53, so that stirring near the end surface can be performed sufficiently. Therefore, good friction stir welding can be achieved.

11 Claims, 6 Drawing Sheets

10, 20:       material
12:           concave portion
13, 22, 23:   convex portion
50:           rotary tool
53, 53b:      large-diameter portion
51b:          screw portion

| 10, 20: | material |
| 12: | concave portion |
| 13, 22, 23: | convex portion |
| 50: | rotary tool |
| 53, 53b: | large-diameter portion |
| 51b: | screw portion |

FRICTION STIR BONDING METHOD

FIELD OF THE INVENTION

The present invention relates to a friction stir welding method.

DESCRIPTION OF THE RELATED ART

A friction stir welding method is a technique in which a round shaft (called a rotary tool) is rotated and inserted into the joint between members to be welded, and the rotating rotary tool is moved along the junction line of the joint, thereby heating, mobilizing and plasticising the material in the welding region, so as to effect a solid-phase welding of the members. The rotary tool comprises a large-diameter portion and the small-diameter portion at the leading end thereof. The welding is performed by inserting the small-diameter portion into the joint between the members to be bonded, such that the end surface of the large-diameter portion comes into contact with the aforementioned members. A screw thread is formed an the small-diameter portion. The end surface of the large-diameter portion on the screw thread side has a concave shape. Moreover, friction stir welding may be performed by positioning members to be bonded between two large-diameter portions of the rotary tool. This technique is disclosed in Japanese Patent No. 2,712,838 (U.S. Pat. No. 5,460,317), and Japanese Patent National Publication of PCT Application No. 9-508073 (EP 0752926B1).

SUMMARY OF THE INVENTION

A case of friction stir welding the abutting region formed between two extruded members 10, 20 made of aluminum alloy will be considered with reference to FIG. 4. A trapezoidal concave portion 12 is provided at the end surface of the face plate 11 of the member 10, and a trapezoidal convex portion 22 is provided at the end surface of the face plate 21 of the member 20. The convex portion 22 is inserted into the concave portion 12 when the two members 10, 20 are abutted. The concave portion 12 and the convex portion 22 have a trapezoidal shape to simplify insertion. Also, the end portions of the members 10, 20 are provided with raised portions 13, 23 projecting upwardly. In the case where the members 10, 20 are used to form a car body of a railway car, the length of the members 10, 20 is approximately 20 m. Therefore, the members 10, 20 at the abutting region may each tend to constitute a substantially different plane. In order to prevent such situation, the end surfaces of the abutting region are provided with the concave portion 12 and the convex portion 22 and are fitted against each other.

In such a state, friction stir welding is performed by rotating and inserting a small-diameter portion 51 of a rotary tool 50 from above into the welding joint until the end surface of a large-diameter portion 53 (end surface on the small-diameter portion 51 side) is inserted slightly into the raised portions 13, 23. The rotating rotary tool 50 is then moved along the welding joint in the abutting region, as is illustrated in FIG. 9. Reference number 100 indicates a bed for fixing the members 10, 20.

The rotary tool 50 used for welding is shown in FIG. 10. The rotary tool 50 has a small-diameter portion 51 attached to the leading end of the large-diameter portion 53. The small-diameter portion 51 has a tapered shape with a larger diameter portion located towards the leading end. This is to stir the material in the abutting region of the concave portion 12 and the convex portion 22 sufficiently. The tapered surface of the small-diameter portion 51 is provided with a male screw thread. The end surface 53h of the large-diameter portion 53 is contoured so as to be concave towards the large-diameter portion 53.

The small-diameter portion 51 in the vicinity of the large-diameter portion 53 (the small-diameter portion 51 on the base end side) is not provided with a screw thread. This is because it is difficult to provide the screw thread on the small-diameter portion 51 close to the base end side due to the fact that the small-diameter portion 51 is tapered.

As seen in FIG. 9, during welding, the region of the small-diameter portion 51 without the screw thread is placed at the position of the upper slopes (called sides) 12b, 22b of the trapezoidal concave portion 12 and the trapezoidal convex portion 22. Therefore, the stirring in this region tends to be insufficient. When stirring is insufficient, this is considered to have an undesirable influence on the strength of the weld. In the case where the material to be welded is an aluminum alloy, the surfaces of the members 10, 20 tend to be oxidized. When stirring is insufficient, it is considered that such metal oxide has a bad influence on the strength of the weld.

An object of the present invention is to provide a friction stir welding method that is capable of providing good welding at the abutting region with the concave portion and convex portion fitted together.

The present invention is characterized by the face that friction stir welding is performed by positioning a screw thread on the rotary tool in the fitted region of the concave portion and the convex portion.

DETAILED DESCRIPTION OF PREFERRED EMBODIMENTS

Figure 5:
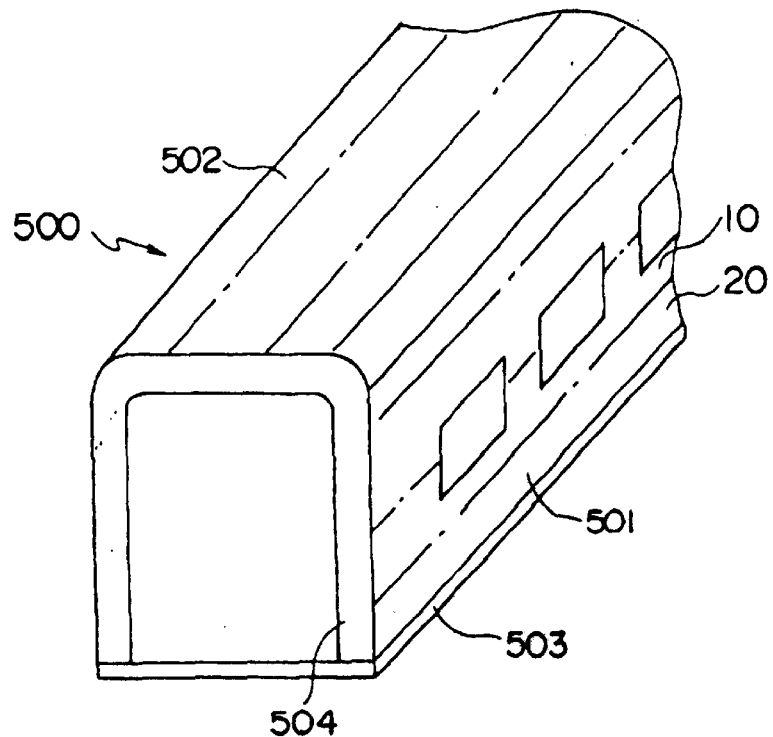
FIG. 5 is a perspective view of a car body of a railway car.
Figure 6:
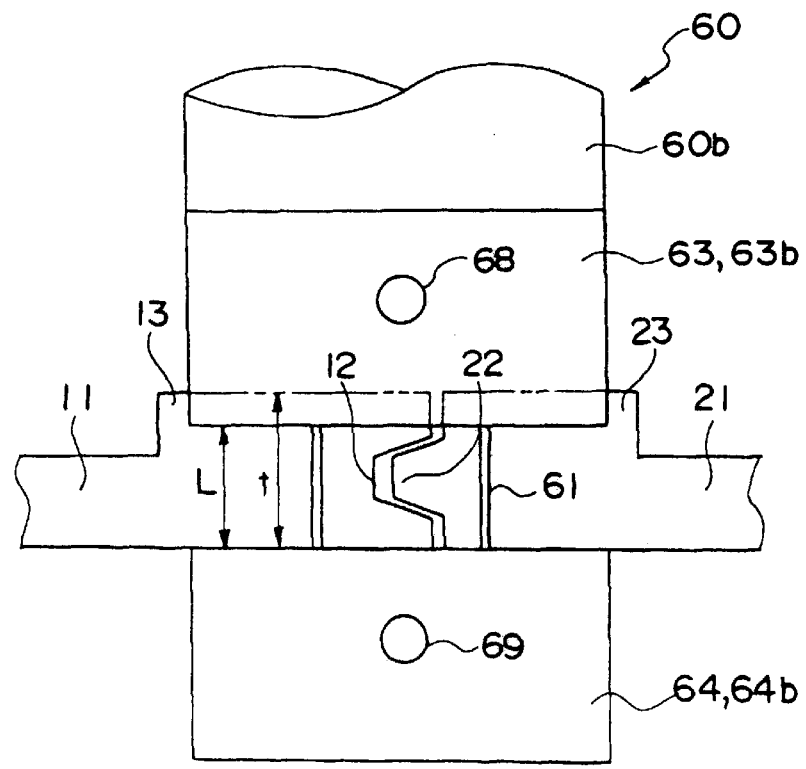
FIG. 6 is a longitudinal cross-sectional view showing welding according to another embodiment of the present invention.

A preferred embodiment of the present invention will now be explained with reference to FIG. 1 through FIG. 5. Referring first to FIG. 5, a car body 500 of a railway car is comprised of a side structure 501 constituting the side surface, a roof structure 502 constituting the roof, an under frame 503 constituting the floor, and an end structure 504 constituting the end portion of the car in the longitudinal direction. The side structure 501, the roof structure 502, and the underframe 503 are formed by joining and welding plural extruded members 10, 20, respectively. The longitudinal direction (extruded direction) of the extruded members 10, 20 is positioned along the longitudinal direction of the car body 500. The extruded members 10, 20 are made of an aluminum alloy. There exists a plurality of ribs at the inner side of the car body, that is, at the side of the face plates 11, 21 from which the raised portion 13, 23 protrude, that are not shown in the figures. The structure of the abutting region of the members 10, 20 is as mentioned earlier.

The parts of a rotary tool 50 are comprised of a round shaft 50b, including a small-diameter portion 51, and a member 53b which forms part of the large-diameter portion 53. To the end portion of the small-diameter portion of the round shaft 50b, from the leading end side, there exists a screw thread portion 51b, including a screw thread on a tapered small-diameter portion, and an axis portion 51c on which the member 53b is fixed for forming a lower end of the large-diameter portion. The leading end of the screw thread portion 51b has a larger diameter. A pin hole 51f is provided on the axis portion 51c for fixing the member 53b thereon via a corresponding pin hold 53f to form the large-diameter portion.

The member 53b corresponds to the lower end of the large-diameter portion 53, and has a circular outer shape. The member 53b has an axial hole 53c into which the axis portion 51c is fitted. The difference between the diameter of the axis portion 51c and the diameter of the hole 53c is small. The member 53b includes the pin hole 53f. The member 53b is mounted on the axis portion 51c and is fixed thereto with a knock pin 58.

Figure 10:
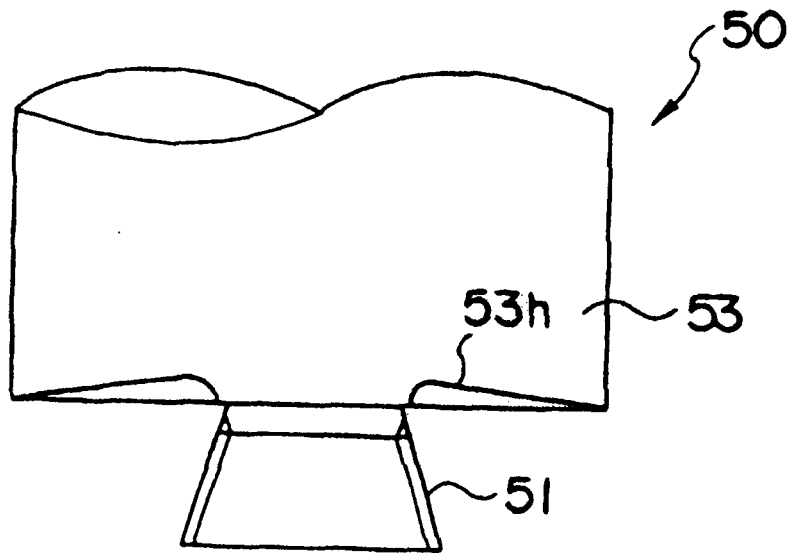
FIG. 10 is a longitudinal cross-sectional view of a conventional rotary tool.

The end surface of the member 53b facing the screw portion 51b is provided with a concave surface 53g. The depth of the concave surface 53g is deeper towards the screw portion 51b and is shallower towards the outer peripheral portion. The concave surface 53g holds the metal to be bonded and restricts the outflow of the metal from the end surface of the large-diameter portion 53. This operation is similar to that of the concave surface 53h shown in FIG. 10.

Figure 1:
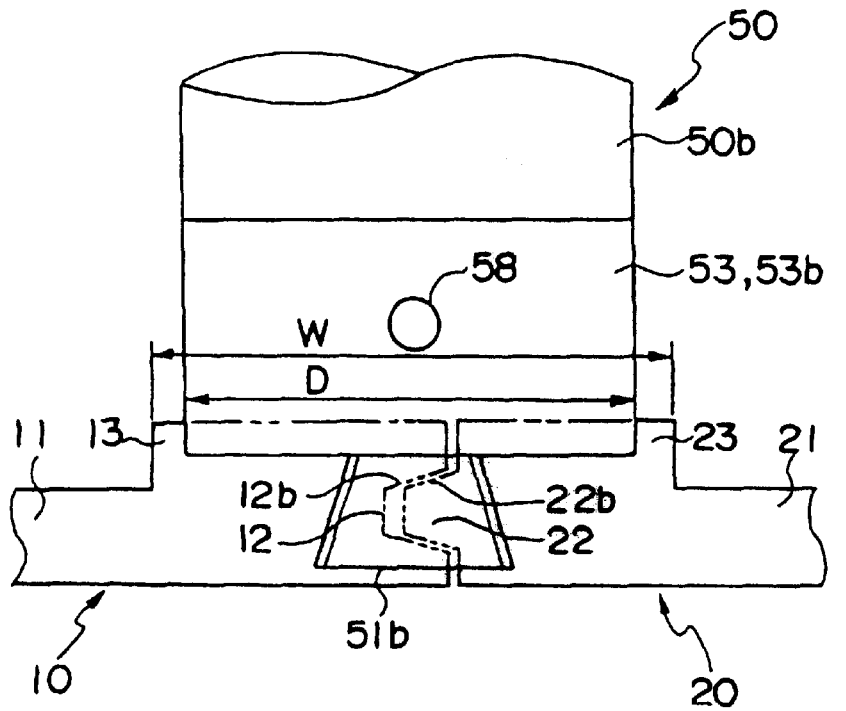
FIG. 1 is a longitudinal cross-sectional view of members being welded according to one embodiment of the present invention.
Figure 2:
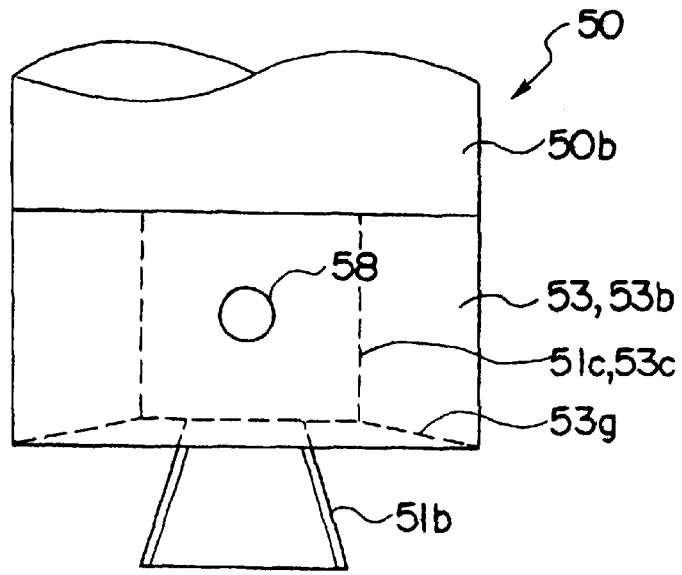
FIG. 2 is a side view of a rotary tool used in the welding illustrated in FIG. 1.
Figure 3:
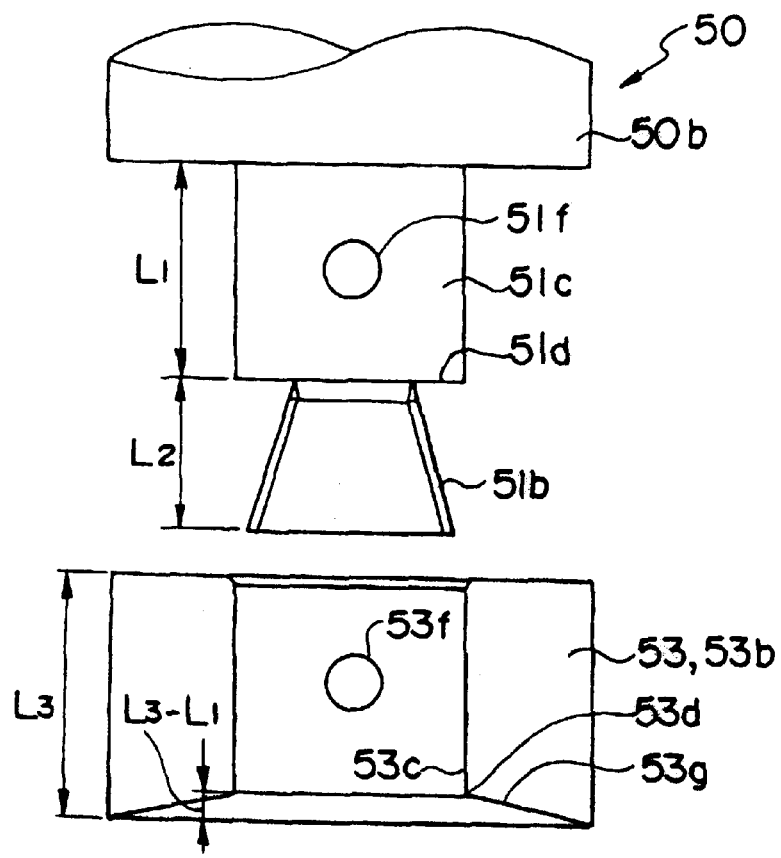
FIG. 3 is a disassembled longitudinal cross-sectional view of the rotary tool shown in FIG. 2.
Figure 4:
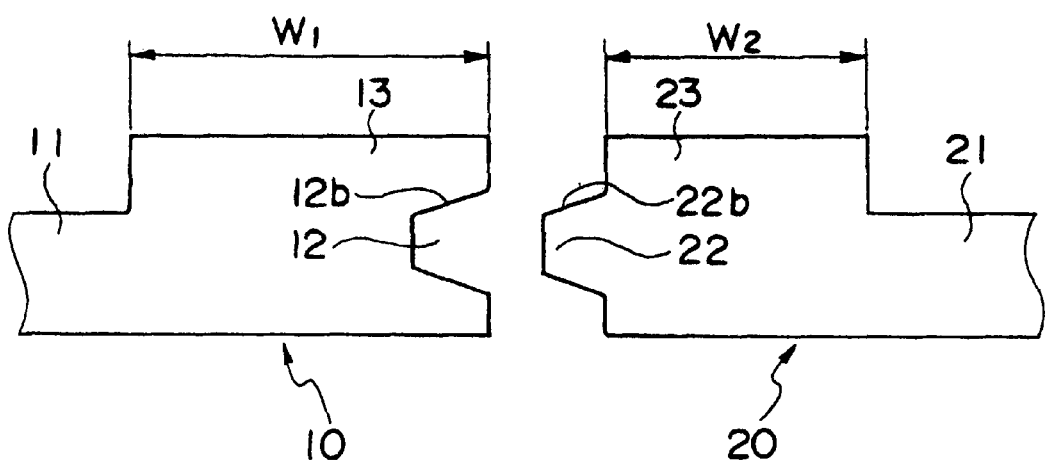
FIG. 4 is a longitudinal cross-sectional view of a pair of extruded members to be welded as illustrated in FIG. 1.

The length L1 of the axis portion 51c is shorter than the length L3 of the member 53b, as seen in FIG. 3. The length L2 of the screw portion 51b is longer than the length of the conventional screw portion 51 by the amount of the difference (L3−L1). The length of the screw thread is elongated relative to the increase of the length L2 of the screw thread portion 51b. The end portion 53d at the inner diameter side of the concave surface 53g of the member 53b is positioned at the end surface 51d of the axis portion 51c. Therefore, when the member 53b is mounted on the axis portion 51c, the screw is positioned inside the bounds of the concave surface 53g. Or, the screw thread is positioned in the vicinity of the end portion in the axial direction of the outer peripheral portion of the member 53b.

The diameter D of the large-diameter portion 53 is smaller than the sum W of the width W1 and the width W2 of the two raised portions 13, 23, respectively. The metal which forms the raised portions 13, 23 becomes the source for filling the gap at the abutting region between the two members 10, 20. Also, during friction stir welding, the lowermost end of the large-diameter portion 53 is inserted to a level below the surface of the raised portions 13, 23 and above the upper surface of the face plates 11, 21 excluding the raised portions 13, 23.

As is well-known in the art, the axis of rotation of the rotary tool 50 is inclined relative to the direction of movement. The axis of rotation is inclined so that the axial center of the small-diameter portion 51 is positioned in the direction of movement forward of the axial center of the large-diameter portion 53. The lowermost end at the rear end of the lower end of the large diameter portion 53 is positioned below the surface of the raised portions 13, 23.

The friction stir welding is performed by placing the axial center of the rotary tool 50 at approximately the center of the concave portion 12 in the depth direction. Therefore, the width WI of the convex portion 13 is larger than the width W2 of the convex portion 23. A driving device for rotating and moving the tool is coupled to the upper end of the round shaft 50b.

With such a structure, the screw thread of screw portion 51b is formed to the vicinity of the end surface of the large-diameter portion (end surface on the side of the screw portion 51b, the base end side of the screw portion 51b). Therefore, the upper slopes (called sides) 12b, 22b of the abutting trapezoidal portions are stirred by the screw thread in the axial direction. Therefore, the problem concerning reduction in the strength of the weld arising from the formation of metal oxide is inhibited.

Figure 7:
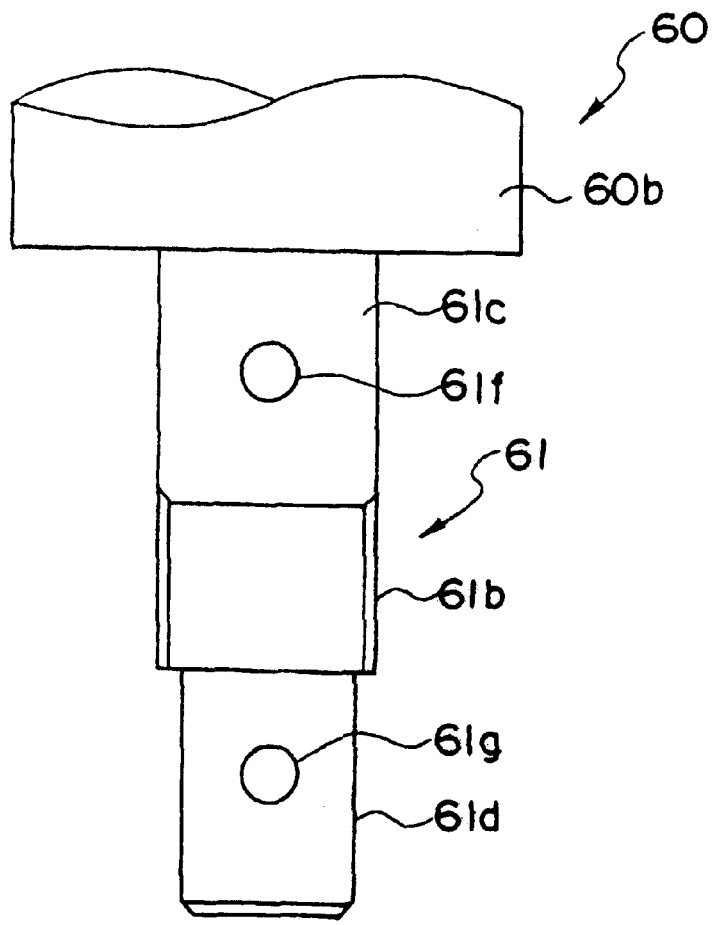
FIG. 7 is a disassembled longitudinal cross-sectional view of the rotary tool shown in FIG. 6.
Figure 7:
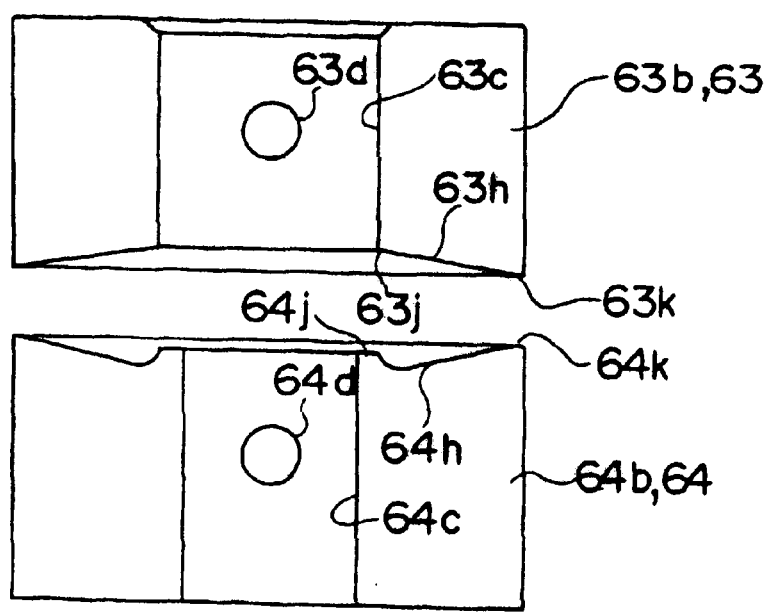
Figure 8:
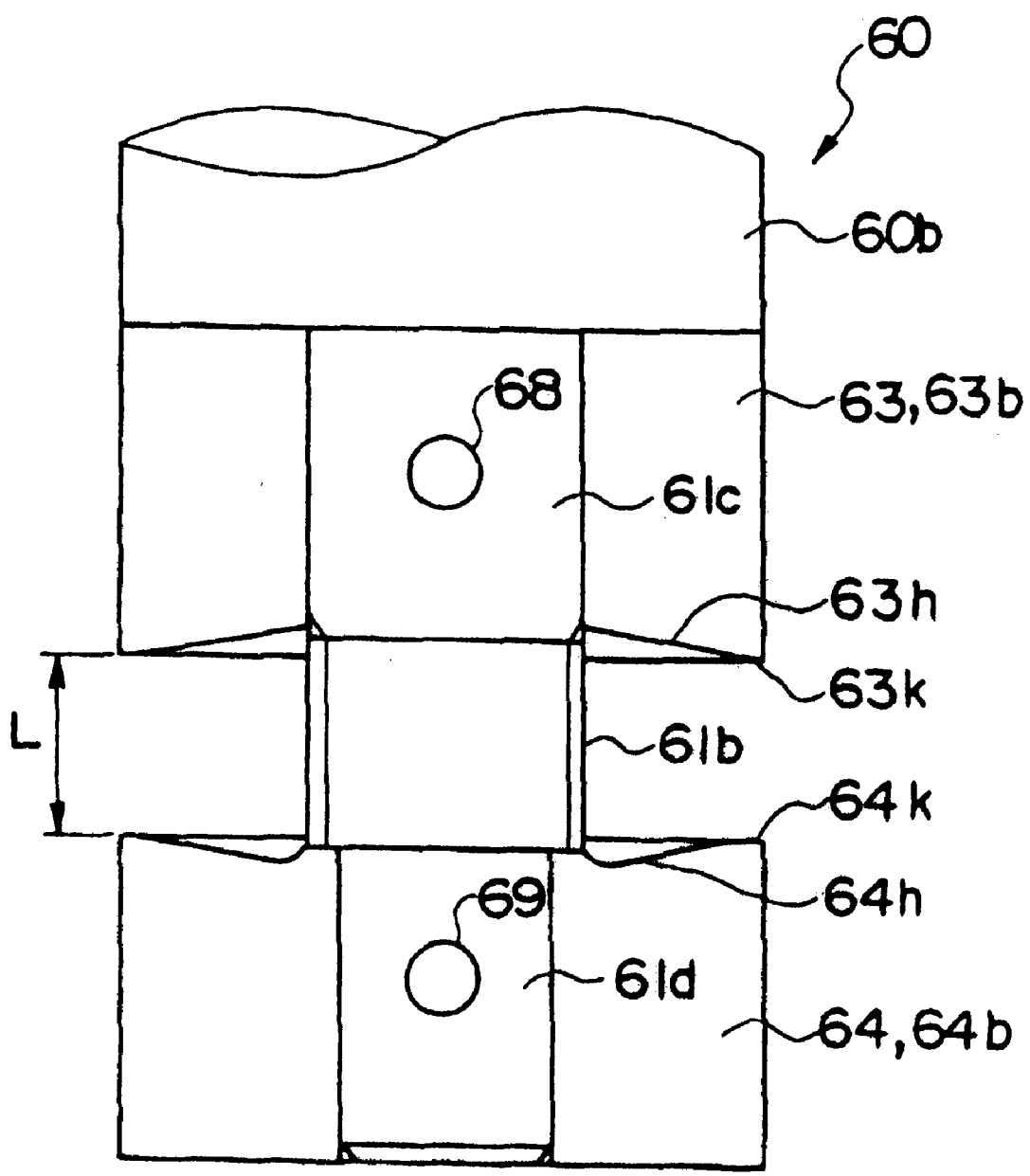
FIG. 8 is a longitudinal cross-sectional view of the assembled rotary tool shown in FIG. 6.
Figure 9:
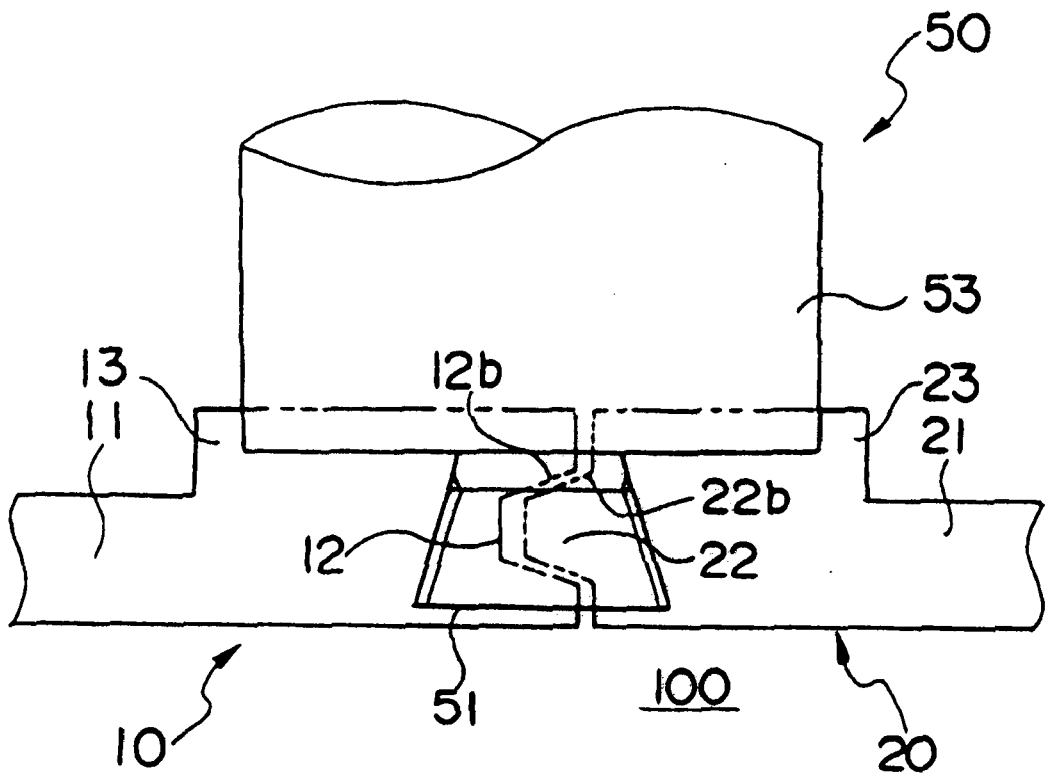
FIG. 9 is a longitudinal cross-sectional view showing welding according to a conventional technique.

In the above-mentioned embodiment, the screw portion 51b is tapered. However, even in the case of a non-tapered (called a linear) screw portion 51b, a similar problem occurs because it is difficult to form the screw to the vicinity of the end surface of the large-diameter portion 53. Therefore, at least a part of the large-diameter portion should be formed as an independent member, even in the case of provision of a linear screw portion, as illustrated in FIG. 7.

In the above-mentioned embodiment, the large-diameter portion 53b is connected to the axis portion 51c with the pin 58. However, these parts may be fixed by shrinking. Moreover, the large-diameter portion 53b may be fixed by forming a screw thread on the axis portion 51c, and screwing it thereon. In this case, the screw should be a reverse screw formed opposite to the direction of rotation.

Furthermore, in the case of performing welding using a conventional rotary tool 50 having no screw thread near the end surface of the large-diameter portion 53, the upper slopes 12b, 22b of the trapezoidal concave portion 12 and convex portion 22 are adjusted to the position of the screw thread of the small-diameter portion 51.

Also, the upper slopes 12b, 22b of the trapezoidal concave portion 12 and convex portion 22 are provided inside the raised portions 13, 23, and welding is performed using a conventional rotary tool 50 having no screw thread near the end surface of the large-diameter portion 53. Subsequently, in order to eliminate the incompletely stirred portion therefrom, the raised portions 13, 23 are cut out. By doing so, an insufficient stirred portion does not exist in the remaining portion, so that there exists no problem concerning strength.

Another embodiment, shown in FIG. 6 through FIG. 9, will now be explained. The embodiment involves the use of a friction stir welding tool having large-diameter portions 63, 64 at either end of the screw thread portion 61b of the small-diameter portion 61 for performing friction stir welding while interposing the abutting region of the members between the two large-diameter portions 63, 64.

A rotary tool 60 is comprised of a round shaft 60b including a small-diameter portion 61, and members 63b, 64b forming large-diameter portions 63, 64. The members 63b, 64b are each-fixed to the axis portions 61c, 61d, respectively, of the round shaft 60b by means of a knock pin. The small-diameter portion 61 is provided with, from the leading end side, the axis portion 61d for holding the member 64b, a screw thread portion 61b, and the axis portion 61c for holding the member 63b. The screw portion 61b is linear. The diameter of the axis portion 61c is identical to that of the screw thread portion 61b. The diameter of the axis portion 61d is smaller than that of the screw thread portion 61b. The length of ordinary screw thread of the screw thread portion 61b is longer than the length L. The position of the screw thread portion 61b depends on the shape of the concave surfaces 63h, 64h. There are provided pin holes 61f, 61g in the axis portions 61c, 61d, respectively.

The members 63b, 64b include axial holes 63c, 64c having a diameter fitting the axis portions 61c, 61d. The difference between the diameter of the axis portions 61c, 61d and that of the axial holes 63c, 64c is small. There are provided pin holes 63d, 64d in the members 63b, 64b. The members 63b, 64b are provided with concave surfaces 63h, 64h having a similar objective as the aforementioned concave surfaces 53h, 53g at the end surface facing the screw thread portion 61b. The end portions 63j, 64j at the inner diameter side of the concave surfaces 63h, 64h are in a concaved position relative to axial ends 63k, 64k at the outer peripheral side of the members 63b, 64b. By doing so, the end portion of the screw thread on the side of the large-diameter portion 63 is positioned inside the bounds of the concave surface 63h of the large-diameter portion 63, as is illustrated in the assembly view of FIG. 8. The end portion of the screw thread on the side of the large-diameter portion 64 is positioned inside the bounds of the concave surface 64h of the large-diameter portion 64.

During welding, the lower end of the large-diameter portion 63 is inserted into the raised portions 13, 23, as in the case of the aforementioned embodiment. The rotary tool 60 is inclined, as in the case of the aforementioned embodiment. The front end of the large-diameter portion 64 of the leading end on the screw thread portion 61b side is inserted into the lower portion of the face plates 11, 21. When performing friction stir welding, the metal is slightly raised against the lower surface of the face plates 11, 21 at the rearward side of the large-diameter portion 64. When using the lower surface of the face plates 11, 21 as the outer surface of the car body, the raised metal mentioned above is cut out to obtain a flat surface.

By doing so, the upper slopes 12b, 22b of the trapezoidal portion can be sufficiently stirred. Also, the lower side of the face plates 11, 21 can be sufficiently stirred. Therefore, the whole range of the abutting region of the face plates 11, 21 can be sufficiently stirred.

In the above-mentioned embodiment, the end portions 63j, 64j of the concave surfaces 63h, 64h on the inner diameter side are formed inwardly relative to the end portions 63k, 64k of the large portions 63, 64. However, they may be formed at the identical position. Furthermore, the concave surfaces 63h, 64h may be formed nearer the end portion of the screw thread. Also, a screw thread may be formed on the axis portion 61c continuing from the screw thread portion 61b, in order to fix the large-diameter portion 63 thereon. This could also be applied to a rotary tool having no large-diameter portion at the leading end.

The technical scope of the present invention is not limited to the terms used in the claims or in the summary of the present invention, but is extended to a range in which a person skilled in the art could easily find equivalents based on the present disclosure.

The present invention enables good welding, in a case of friction stir welding a fitted region formed by a trapezoidal concave portion and convex portion.

We claim:

1. A friction stir bonding method, the method comprising the steps of;
   butting an end portion of a first member against an end portion of a second member;
   equipping a small-diameter portion being equipped with a screw to the leading end of a large-diameter portion, and providing a second large-diameter portion of a member different from that of said small-diameter portion to an axis portion at the leading end of said small-diameter portion;
   using a rotary tool including end surfaces of said large-diameter portion and said second large-diameter potion facing said small-diameter portion being concaved; and
   friction stir bonding while interposing said butted region between said large-diameter portion and said second large-diameter portion.

2. A friction stir bonding method according to claim 1, wherein:
   said end portion of said first member includes a trapezoid-shaped convex portion projecting in said butting direction, and said end portion of said second member includes a trapezoid-shaped concave portion inserted with said convex portion; and
   friction stir bonding is performed in the state where said screw is positioned at sides of said concave portion and said convex portion on said large-diameter portion side.

3. A friction stir bonding method according to claim 1, wherein an end portion of said screw on said second large-diameter portion side exists inside said concave of said second large-diameter portion.

4. A friction stir bonding method according to claim 1, wherein said large-diameter portion and said small-diameter portion are of a different member, and an end portion of said screw on said large-diameter portion side exists inside said concave of said large-diameter portion.

5. A friction stir bonding method, the method comprising the steps of:
   butting an end portion of a first member including a first convex portion projecting in the thickness direction against an end portion of a second member including a first convex portion projecting in the thickness direction;
   inserting a second convex portion projecting in said butting direction provided on said end portion including said first convex portion of said first member into a convex portion provided on said end portion including said first convex portion of said second member;
   friction stir bonding using a rotary tool made of a large-diameter portion and a small-diameter portion being equipped with a screw, by inserting said small-diameter portion into said butted region, in a state where said large-diameter portion is inserted into each of said first convex portions of said first member and said second member; and
   cutting out each of said first convex portions of said first member and said second member, subsequently.

6. A friction stir welding method, the method comprising the steps of:
   butting an end portion of a first member against an end portion of a second member, to provide a butted region; and
   friction stir welding using a rotary tool having a small-diameter portion beyond a leading edge of a large-diameter portion, the small-diameter portion having a tapered shape with a smaller diameter closest to the leading edge of the large-diameter portion, the friction stir welding being performed by inserting the small-diameter portion into the butted region of the first and second members, wherein said small-diameter portion extends from said leading edge of said large-diameter portion, and has threads from an end thereof adjacent the large-diameter portion to an end opposite thereto.

7. A friction stir welding method according to claim 6, wherein an end of the large-diameter portion, adjacent the small-diameter portion, has a concave portion, the small-diameter portion extending into the concave portion.

8. A friction stir welding method according to claim 7, wherein the small-diameter portion has threads, up to the large-diameter portion.

9. A friction stir welding method according to claim 8 wherein the end portions of the first and second members respectively have a concave portion and a convex portion, the convex portion of the end portion of the first member extending into the concave portion of the end portion of the second member, in the butted region, when the end portion of the first member is butted against the end portion of the second member.

10. A friction stir welding method according to claim 6, wherein said small-diameter portion has threads up to the large-diameter portion.

11. A friction stir welding method, the method comprising the steps of:

butting an end portion of a first member against an end portion of a second member, to provide a butted region; and friction stir welding using a rotary tool having a small-diameter portion beyond a leading edge of a large-diameter portion, the small-diameter portion having a tapered shape with a smaller diameter closest to the leading edge of the large-diameter portion, the friction stir welding being performed by inserting the small-diameter portion into the butted region of the first and second members, wherein faces of the first and second members, into which the small-diameter portion is inserted, have raised portions extending in a direction toward the rotary tool, and wherein a sum of lengths of the raised portions is greater than the diameter of the large-diameter portion of the rotary tool.

\* \* \* \* \*